(12) United States Patent
Moriyama

(10) Patent No.: US 8,570,424 B2
(45) Date of Patent: Oct. 29, 2013

(54) DISPLAY CONTROL APPARATUS AND DISPLAY CONTROL METHOD

(75) Inventor: Ayumi Moriyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/080,862

(22) Filed: Apr. 6, 2011

(65) Prior Publication Data

US 2011/0249166 A1    Oct. 13, 2011

(30) Foreign Application Priority Data

Apr. 13, 2010 (JP) ................................ 2010-092530

(51) Int. Cl.
*H04N 5/222* (2006.01)

(52) U.S. Cl.
USPC .................................................... 348/333.02

(58) Field of Classification Search
USPC ............... 348/333.02–333.05, 207.99, 231.2, 348/231.5, 222.1, 211.12, 110, 107
See application file for complete search history.

(56) References Cited

U.S. PATENT DOCUMENTS

| | | | |
|---|---|---|---|
| 6,133,947 A * | 10/2000 | Mikuni | 348/143 |
| 7,526,718 B2 * | 4/2009 | Samadani et al. | 715/201 |
| 7,627,420 B2 | 12/2009 | Ujino | |
| 7,792,636 B2 | 9/2010 | Ujino | |
| 7,813,872 B2 | 10/2010 | Ujino | |
| 8,248,503 B2 * | 8/2012 | Sogoh et al. | 348/333.02 |
| 2010/0064239 A1 * | 3/2010 | Crawford et al. | 715/771 |

FOREIGN PATENT DOCUMENTS

JP    2006-85588 A    3/2006

* cited by examiner

*Primary Examiner* — James Hannett
*Assistant Examiner* — Ahmed A Berhan
(74) *Attorney, Agent, or Firm* — Canon USA Inc. IP Division

(57) ABSTRACT

A display apparatus displays a distance bar indicating a ratio of movement distance to the entire photographing route, and a time bar indicating a ratio to the entire time, together with photographed images. Moreover, the display apparatus displays specific photographing date/time on top of the time bar. During slide show display, when one of separator lines indicating photographing locations is designated, the slide show is immediately switched to a display of the photographed image. At this time, the distance bar is updated to the designated separator line, and corresponding to this, the time bar is also updated to time when photographing is performed at the designated separator line. Thereafter, when a certain time has elapsed, the slide show display is resumed in the order of photographing from the photographed image.

20 Claims, 15 Drawing Sheets

FIG.10A

| IMAGE FILE PATH | PHOTOGRAPHING DATE/TIME | PHOTOGRAPHING LOCATION INFORMATION | | AREA INFORMATION | | | CHECK |
|---|---|---|---|---|---|---|---|
| | | LATITUDE | LONGITUDE | INFORMATION 1 | INFORMATION 2 | INFORMATION 3 | |
| C:¥MyPictures¥IMG_0001.JPG | 2008/08/10 11:25:20 | ±dd.mm.ss.sss | ±dd.mm.ss.sss | | | | |
| C:¥MyPictures¥IMG_0002.JPG | 2008/08/10 11:28:04 | ±dd.mm.ss.sss | ±dd.mm.ss.sss | | | | |
| C:¥MyPictures¥IMG_0003.JPG | 2008/08/10 11:50:32 | ±dd.mm.ss.sss | ±dd.mm.ss.sss | | | | |
| C:¥MyPictures¥IMG_0004.JPG | 2008/08/10 12:11:23 | ±dd.mm.ss.sss | ±dd.mm.ss.sss | | | | |
| C:¥MyPictures¥IMG_0005.JPG | 2008/08/10 12:12:09 | ±dd.mm.ss.sss | ±dd.mm.ss.sss | | | | |
| C:¥MyPictures¥IMG_0006.JPG | 2008/08/10 12:59:57 | ±dd.mm.ss.sss | ±dd.mm.ss.sss | | | | |
| C:¥MyPictures¥IMG_0007.JPG | 2008/08/10 13:00:15 | ±dd.mm.ss.sss | ±dd.mm.ss.sss | | | | |
| C:¥MyPictures¥IMG_0008.JPG | 2008/08/10 13:06:41 | ±dd.mm.ss.sss | ±dd.mm.ss.sss | | | | |
| C:¥MyPictures¥IMG_0009.JPG | 2008/08/10 13:08:18 | ±dd.mm.ss.sss | ±dd.mm.ss.sss | | | | |
| C:¥MyPictures¥IMG_0010.JPG | 2008/08/10 13:17:29 | ±dd.mm.ss.sss | ±dd.mm.ss.sss | | | | |
| C:¥MyPictures¥IMG_0011.JPG | 2008/08/10 13:34:30 | ±dd.mm.ss.sss | ±dd.mm.ss.sss | | | | |
| C:¥MyPictures¥IMG_0012.JPG | 2008/08/10 13:39:14 | ±dd.mm.ss.sss | ±dd.mm.ss.sss | | | | |
| C:¥MyPictures¥IMG_0013.JPG | 2008/08/10 13:42:55 | ±dd.mm.ss.sss | ±dd.mm.ss.sss | | | | |
| C:¥MyPictures¥IMG_0014.JPG | 2008/08/10 13:46:16 | ±dd.mm.ss.sss | ±dd.mm.ss.sss | | | | |

FIG.10B

| IMAGE FILE PATH | PHOTOGRAPHING DATE/TIME | PHOTOGRAPHING LOCATION INFORMATION | | AREA INFORMATION | | | CHECK |
|---|---|---|---|---|---|---|---|
| | | LATITUDE | LONGITUDE | INFORMATION 1 | INFORMATION 2 | INFORMATION 3 | |
| C:¥MyPictures¥IMG_0001.JPG | 2008/08/10 11:25:20 | ±dd.mm.ss.sss | ±dd.mm.ss.sss | JAPAN | TOKYO METROPOLITAN | "A" STATION | |
| C:¥MyPictures¥IMG_0002.JPG | 2008/08/10 11:28:04 | ±dd.mm.ss.sss | ±dd.mm.ss.sss | JAPAN | TOKYO METROPOLITAN | "A" STATION | |
| C:¥MyPictures¥IMG_0003.JPG | 2008/08/10 11:50:32 | ±dd.mm.ss.sss | ±dd.mm.ss.sss | JAPAN | TOKYO METROPOLITAN | "B" HOSPITAL | |
| C:¥MyPictures¥IMG_0004.JPG | 2008/08/10 12:11:23 | ±dd.mm.ss.sss | ±dd.mm.ss.sss | JAPAN | TOKYO METROPOLITAN | "A" STATION | |
| C:¥MyPictures¥IMG_0005.JPG | 2008/08/10 12:12:09 | ±dd.mm.ss.sss | ±dd.mm.ss.sss | JAPAN | TOKYO METROPOLITAN | "A" STATION | |
| C:¥MyPictures¥IMG_0006.JPG | 2008/08/10 12:59:57 | ±dd.mm.ss.sss | ±dd.mm.ss.sss | JAPAN | TOKYO METROPOLITAN | "C" PARK | |
| C:¥MyPictures¥IMG_0007.JPG | 2008/08/10 13:00:15 | ±dd.mm.ss.sss | ±dd.mm.ss.sss | JAPAN | TOKYO METROPOLITAN | "C" PARK | |
| C:¥MyPictures¥IMG_0008.JPG | 2008/08/10 13:06:41 | ±dd.mm.ss.sss | ±dd.mm.ss.sss | JAPAN | TOKYO METROPOLITAN | "C" PARK | |
| C:¥MyPictures¥IMG_0009.JPG | 2008/08/10 13:08:18 | ±dd.mm.ss.sss | ±dd.mm.ss.sss | JAPAN | TOKYO METROPOLITAN | "C" PARK | |
| C:¥MyPictures¥IMG_0010.JPG | 2008/08/10 13:17:29 | ±dd.mm.ss.sss | ±dd.mm.ss.sss | JAPAN | TOKYO METROPOLITAN | "C" PARK | |
| C:¥MyPictures¥IMG_0011.JPG | 2008/08/10 13:34:30 | ±dd.mm.ss.sss | ±dd.mm.ss.sss | JAPAN | TOKYO METROPOLITAN | "D" SHOPPING CENTER | |
| C:¥MyPictures¥IMG_0012.JPG | 2008/08/10 13:39:14 | ±dd.mm.ss.sss | ±dd.mm.ss.sss | JAPAN | TOKYO METROPOLITAN | "D" SHOPPING CENTER | |
| C:¥MyPictures¥IMG_0013.JPG | 2008/08/10 13:42:55 | ±dd.mm.ss.sss | ±dd.mm.ss.sss | JAPAN | TOKYO METROPOLITAN | "D" SHOPPING CENTER | |
| C:¥MyPictures¥IMG_0014.JPG | 2008/08/10 13:46:16 | ±dd.mm.ss.sss | ±dd.mm.ss.sss | JAPAN | TOKYO METROPOLITAN | "D" SHOPPING CENTER | |

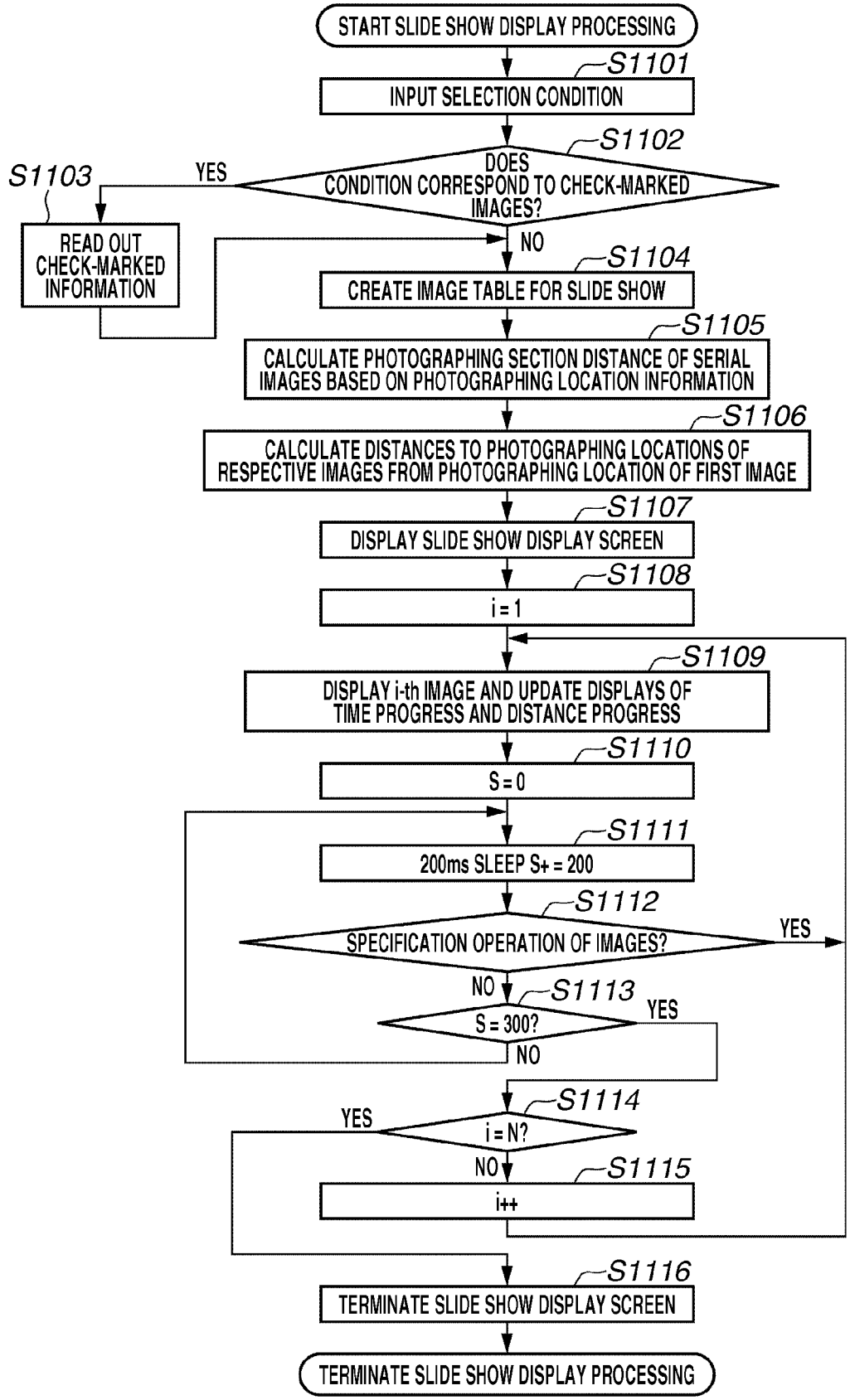

FIG.12A

| IMAGE FILE PATH | PHOTOGRAPHING DATE/TIME | PHOTOGRAPHING LOCATION INFORMATION | | AREA INFORMATION | | | CHECK |
|---|---|---|---|---|---|---|---|
| | | LATITUDE | LONGITUDE | INFORMATION 1 | INFORMATION 2 | INFORMATION 3 | |
| C:¥MyPictures¥IMG_0001.JPG | 2008/08/10 11:25:20 | ±dd.mm.ss.sss | ±dd.mm.ss.sss | JAPAN | TOKYO METROPOLITAN | "A" STATION | 0 |
| C:¥MyPictures¥IMG_0002.JPG | 2008/08/10 11:28:04 | ±dd.mm.ss.sss | ±dd.mm.ss.sss | JAPAN | TOKYO METROPOLITAN | "A" STATION | 5 |
| C:¥MyPictures¥IMG_0003.JPG | 2008/08/10 11:50:32 | ±dd.mm.ss.sss | ±dd.mm.ss.sss | JAPAN | TOKYO METROPOLITAN | "B" HOSPITAL | 950 |
| C:¥MyPictures¥IMG_0004.JPG | 2008/08/10 12:11:23 | ±dd.mm.ss.sss | ±dd.mm.ss.sss | JAPAN | TOKYO METROPOLITAN | "A" STATION | 1980 |
| C:¥MyPictures¥IMG_0005.JPG | 2008/08/10 12:12:09 | ±dd.mm.ss.sss | ±dd.mm.ss.sss | JAPAN | TOKYO METROPOLITAN | "A" STATION | 1982 |
| C:¥MyPictures¥IMG_0006.JPG | 2008/08/10 12:59:57 | ±dd.mm.ss.sss | ±dd.mm.ss.sss | JAPAN | TOKYO METROPOLITAN | "C" PARK | 2615 |
| C:¥MyPictures¥IMG_0007.JPG | 2008/08/10 13:00:15 | ±dd.mm.ss.sss | ±dd.mm.ss.sss | JAPAN | TOKYO METROPOLITAN | "C" PARK | 2620 |
| C:¥MyPictures¥IMG_0008.JPG | 2008/08/10 13:06:41 | ±dd.mm.ss.sss | ±dd.mm.ss.sss | JAPAN | TOKYO METROPOLITAN | "C" PARK | 2685 |
| C:¥MyPictures¥IMG_0009.JPG | 2008/08/10 13:08:18 | ±dd.mm.ss.sss | ±dd.mm.ss.sss | JAPAN | TOKYO METROPOLITAN | "C" PARK | 2710 |
| C:¥MyPictures¥IMG_0010.JPG | 2008/08/10 13:17:29 | ±dd.mm.ss.sss | ±dd.mm.ss.sss | JAPAN | TOKYO METROPOLITAN | "C" PARK | 2790 |
| C:¥MyPictures¥IMG_0011.JPG | 2008/08/10 13:34:30 | ±dd.mm.ss.sss | ±dd.mm.ss.sss | JAPAN | TOKYO METROPOLITAN | "D" SHOPPING CENTER | 3675 |
| C:¥MyPictures¥IMG_0012.JPG | 2008/08/10 13:39:14 | ±dd.mm.ss.sss | ±dd.mm.ss.sss | JAPAN | TOKYO METROPOLITAN | "D" SHOPPING CENTER | 3705 |
| C:¥MyPictures¥IMG_0013.JPG | 2008/08/10 13:42:55 | ±dd.mm.ss.sss | ±dd.mm.ss.sss | JAPAN | TOKYO METROPOLITAN | "D" SHOPPING CENTER | 3750 |
| C:¥MyPictures¥IMG_0014.JPG | 2008/08/10 13:46:16 | ±dd.mm.ss.sss | ±dd.mm.ss.sss | JAPAN | TOKYO METROPOLITAN | "D" SHOPPING CENTER | 3800 |

FIG.12B

| IMAGE FILE PATH | PHOTOGRAPHING DATE/TIME | PHOTOGRAPHING LOCATION INFORMATION | | AREA INFORMATION | | | CHECK |
|---|---|---|---|---|---|---|---|
| | | LATITUDE | LONGITUDE | INFORMATION 1 | INFORMATION 2 | INFORMATION 3 | |
| C:¥MyPictures¥IMG_0001.JPG | 2008/08/16 19:24:12 | ±dd.mm.ss.sss | ±dd.mm.ss.sss | JAPAN | CHIBA PREFECTURE | NARITA INTERNATIONAL AIRPORT | |
| C:¥MyPictures¥IMG_0002.JPG | 2008/08/16 20:11:04 | ±dd.mm.ss.sss | ±dd.mm.ss.sss | JAPAN | CHIBA PREFECTURE | NARITA INTERNATIONAL AIRPORT | |
| C:¥MyPictures¥IMG_0003.JPG | 2008/08/17 07:50:42 | ±dd.mm.ss.sss | ±dd.mm.ss.sss | AMERICA | TOKYO METROPOLITAN | HONOLULU AIRPORT | |
| C:¥MyPictures¥IMG_0004.JPG | 2008/08/17 08:04:13 | ±dd.mm.ss.sss | ±dd.mm.ss.sss | AMERICA | TOKYO METROPOLITAN | HONOLULU AIRPORT | |
| C:¥MyPictures¥IMG_0005.JPG | 2008/08/17 13:12:19 | ±dd.mm.ss.sss | ±dd.mm.ss.sss | AMERICA | TOKYO METROPOLITAN | "A" SHOPPING CENTER | |
| C:¥MyPictures¥IMG_0006.JPG | 2008/08/17 14:15:52 | ±dd.mm.ss.sss | ±dd.mm.ss.sss | AMERICA | TOKYO METROPOLITAN | "A" SHOPPING CENTER | |
| C:¥MyPictures¥IMG_0007.JPG | 2008/08/17 16:01:02 | ±dd.mm.ss.sss | ±dd.mm.ss.sss | AMERICA | TOKYO METROPOLITAN | "A" SHOPPING CENTER | |
| C:¥MyPictures¥IMG_0008.JPG | 2008/08/18 01:03:23 | ±dd.mm.ss.sss | ±dd.mm.ss.sss | AMERICA | TOKYO METROPOLITAN | "B" HOTEL | |
| C:¥MyPictures¥IMG_0009.JPG | 2008/08/18 01:02:11 | ±dd.mm.ss.sss | ±dd.mm.ss.sss | AMERICA | TOKYO METROPOLITAN | "B" HOTEL | |
| C:¥MyPictures¥IMG_0010.JPG | 2008/08/18 08:17:29 | ±dd.mm.ss.sss | ±dd.mm.ss.sss | AMERICA | TOKYO METROPOLITAN | "W" BEACH | |
| C:¥MyPictures¥IMG_0011.JPG | 2008/08/18 15:01:30 | ±dd.mm.ss.sss | ±dd.mm.ss.sss | AMERICA | TOKYO METROPOLITAN | HONOLULU AIRPORT | |
| C:¥MyPictures¥IMG_0012.JPG | 2008/08/19 23:45:28 | ±dd.mm.ss.sss | ±dd.mm.ss.sss | JAPAN | CHIBA PREFECTURE | NARITA INTERNATIONAL AIRPORT | |

DISPLAY CONTROL APPARATUS AND DISPLAY CONTROL METHOD

BACKGROUND OF THE INVENTION

1. Field of the Invention

The present invention relates to a display control apparatus, a display control method, program and a recording medium, and more particularly, relates to a suitable technique for displaying a plurality of images.

2. Description of the Related Art

In recent years, a software for mapping photographed images provided with location information based on a global positioning system (GPS) on a map is known. There is already available a technique, for example, by which when a photographing point is reached by tracking a photographing route displayed on the map, an image photographed at the photographing point is displayed.

However, in a case where the photographed images are displayed together with the map, when the images which were photographed while moving a wide range are displayed, a wide-area map and the photographed images will be displayed on one screen. Accordingly, a map with a high reduction scale must be displayed, resulting in such a map that allows a user to figure out only rough locations. Further, since the map and the photographed images are displayed, there is a problem that the photographed images will be displayed smaller, and an original pleasure to appreciate images will be impaired.

Further, if map data for displaying the map is to be retained, a capacity of a memory will become larger, and a mass memory will be required, thus leading to an increased cost. On the other hand, in a conventional display method of appreciating only images without display of the map, a location where the image was photographed cannot be confirmed, and when showing the image to anyone else, the person who photographed the image, or the travelling companion has to make unnecessary explanation.

SUMMARY OF THE INVENTION

The present invention is directed to display location information together with photographed images in a simple manner.

According to an aspect of the present invention, a display control apparatus includes an acquisition unit configured to acquire a plurality of photographed images, a calculation unit configured to calculate movement process when the plurality of images is photographed from photographic information of the plurality of photographed images, and a display control unit configured to display on a display unit a bar indicating movement process when the plurality of photographed images is photographed, and display information indicating photographing locations of the plurality of photographed images, at positions corresponding to photographing locations of the plurality of photographed images in the bar indicating the movement process.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A and 10B illustrate examples of image tables.

FIG. 11 is a flowchart illustrating an example of processing of a slide show display.

FIGS. 12A and 12B illustrate examples of image tables.

DESCRIPTION OF THE EMBODIMENTS

Various exemplary embodiments, features, and aspects of the invention will be described in detail below with reference to the drawings.

Figure 1:
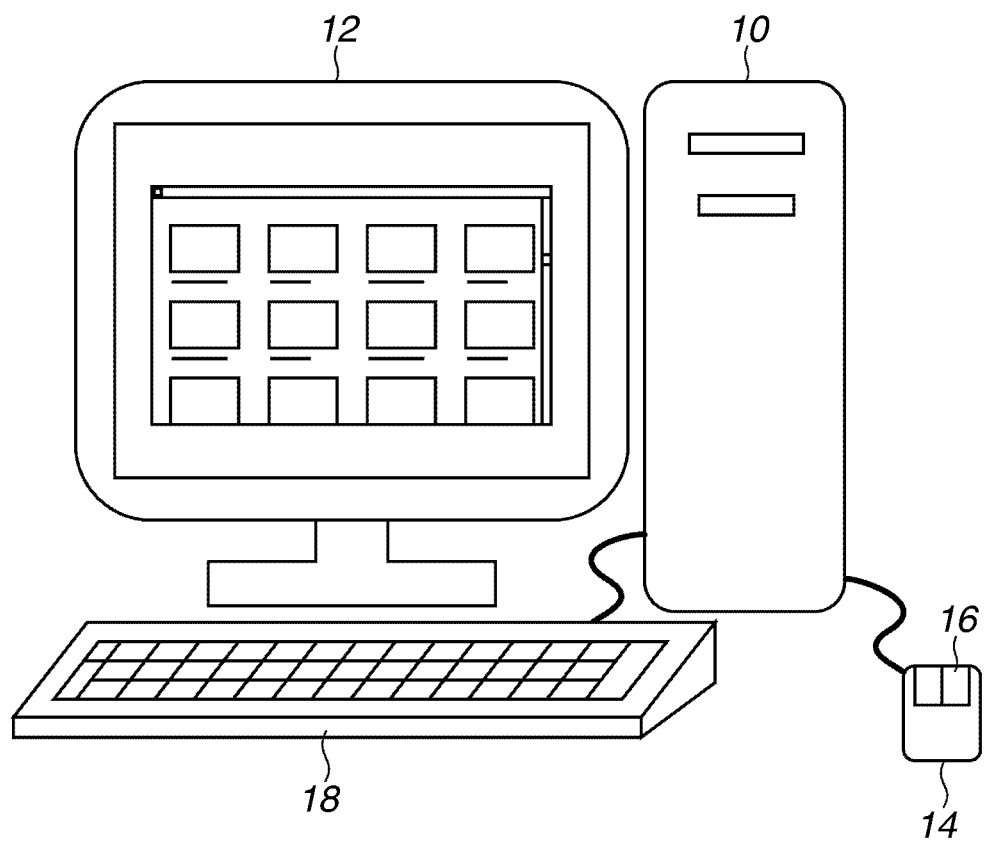
FIG. 1 illustrates an outer configuration example of a personal computer (PC).

Hereinbelow, referring to the drawings, a first exemplary embodiment of the present invention will be described in detail. FIG. 1 illustrates an outer configuration example of a personal computer (PC) 10 in the present exemplary embodiment. In FIG. 1, the PC 10 is provided with drivers including a function for performing a network communication, and an operating system (OS) function. A monitor 12 which can display outputs of the PC 10 as images, a mouse 14 including a mouse button 16, and a keyboard 18 are connected to the PC 10.

Figure 2:
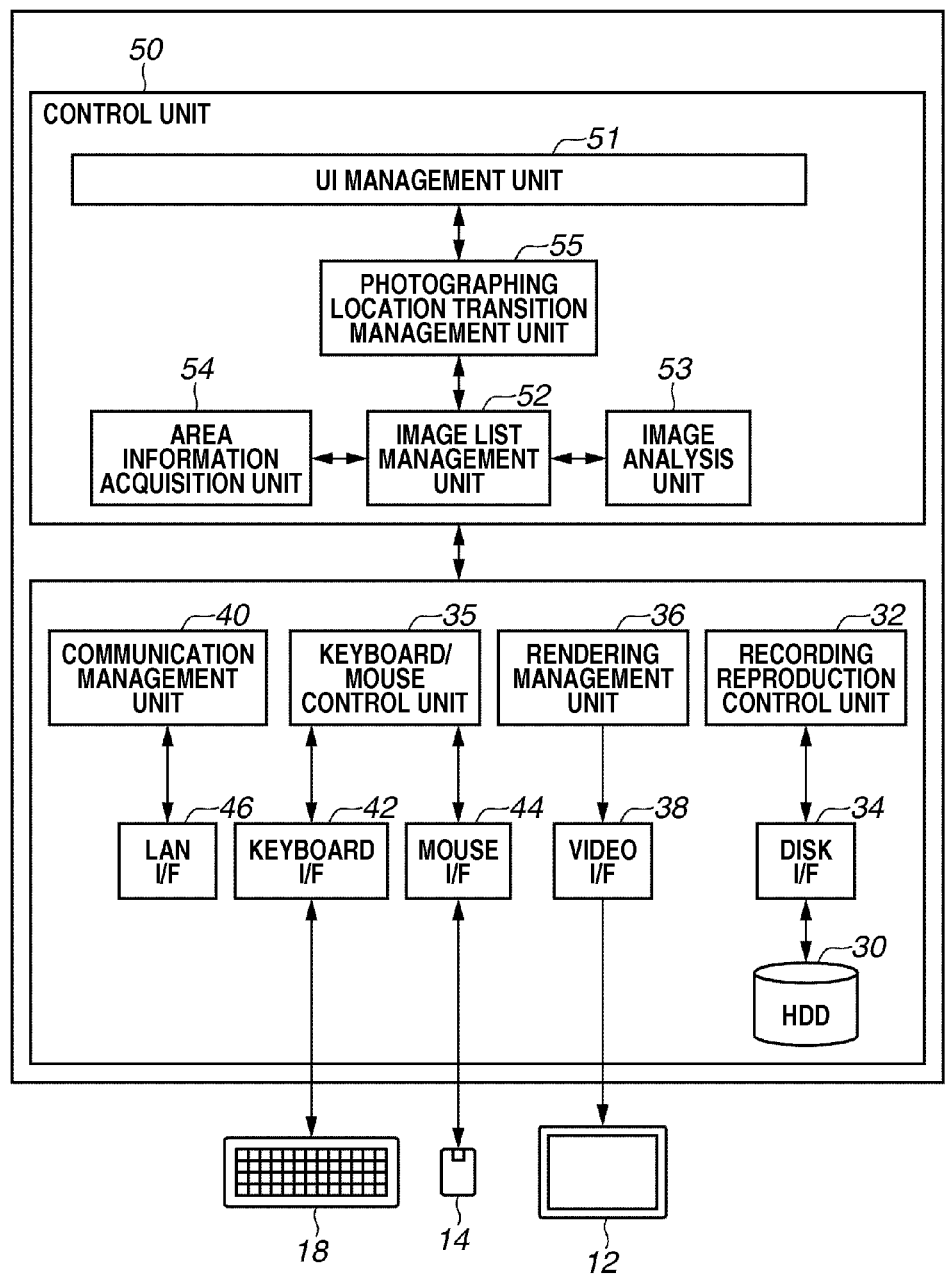
FIG. 2 is a block diagram illustrating a functional configuration example of the PC in an exemplary embodiment of the present invention.

FIG. 2 is a block diagram illustrating a functional configuration example of the PC 10 in the present exemplary embodiment. In the PC 10 main body, there is an operating system (OS) within hardware, and application software is located above it. Elements which are not directly relevant in understanding a configuration of the present exemplary embodiment, for example, the CPU, and a memory management system of the operating system will be omitted in FIG. 2.

In FIG. 2, a hard work drive (HDD) 30 is used as an auxiliary storage apparatus, and a recording reproduction unit 32 controls writing and reading of files in accordance with the control of a control unit 50. A file system used in the present exemplary embodiment is a publicly known system such as a File Allocation Table (FAT). A disk input/output I/F 34 is an interface for reading and writing data from and to the HDD 30 under control of the recording reproduction unit 32.

A rendering management unit 36 is used to generate image data in accordance with the control of the control unit 50. A video I/F 38 is an interface that converts image data generated by the rendering management unit 36 into video signals which are compatible with the monitor 12. A keyboard/mouse control unit 35 is used to acquire signals input from a keyboard 18 and a mouse 14 in accordance with the control of the control unit 50. Further, a keyboard I/F 42 is an interface for connecting the keyboard 18, and a mouse I/F 44 is an interface for connecting the mouse 14. A communication management unit 40 is used to perform control to connect to a network by a wired LAN or a wireless LAN via the control from the control unit 50. Further, a LAN I/F 46 is an interface for connecting with the LAN.

The control unit 50 is used to control the entire PC 10, and performs control to read out image files stored in, for example, the HDD 30, and display the image on the monitor 12 or the like. A UI management unit 51 manages in general a display control relating to a user interface, and an image display and the like, out of the controls by the control unit 50. An image list management unit 52 builds lists of and manages information of the image files handled by the control unit 50, out of the image files stored in the HDD 30, and manages analysis results by an image analysis unit 53 as well. The image analysis unit 53 is used to analyze image information such as latitudes and longitudes, among photographing date/time and photographing location information.

An area information acquisition unit 54 is used to acquire area information from an external wireless base station or the like via the communication management unit 40. In this case, data base of location information and area information may be provided in the HDD 30 or a server on the network. The acquired area information is managed by the image list management unit 52. The photographing location transition management unit 55 calculates distances to the photographing locations of respective images, from the photographic information such as latitudes and longitudes managed by the image list management unit 52. Then, the photographing location transition management unit 55 is used to manage a photographing location of a current image, from a total distance from a photographing location of a first image to a photographing location of a last image, and notifies the UI management unit 51.

In the present exemplary embodiment, while description has been given taking a configuration of the PC 10 as an example, the functions of the present exemplary embodiment can be also implemented by, not only the PC 10, but also a portable device such as a digital camera or an image display apparatus.

Figure 3:
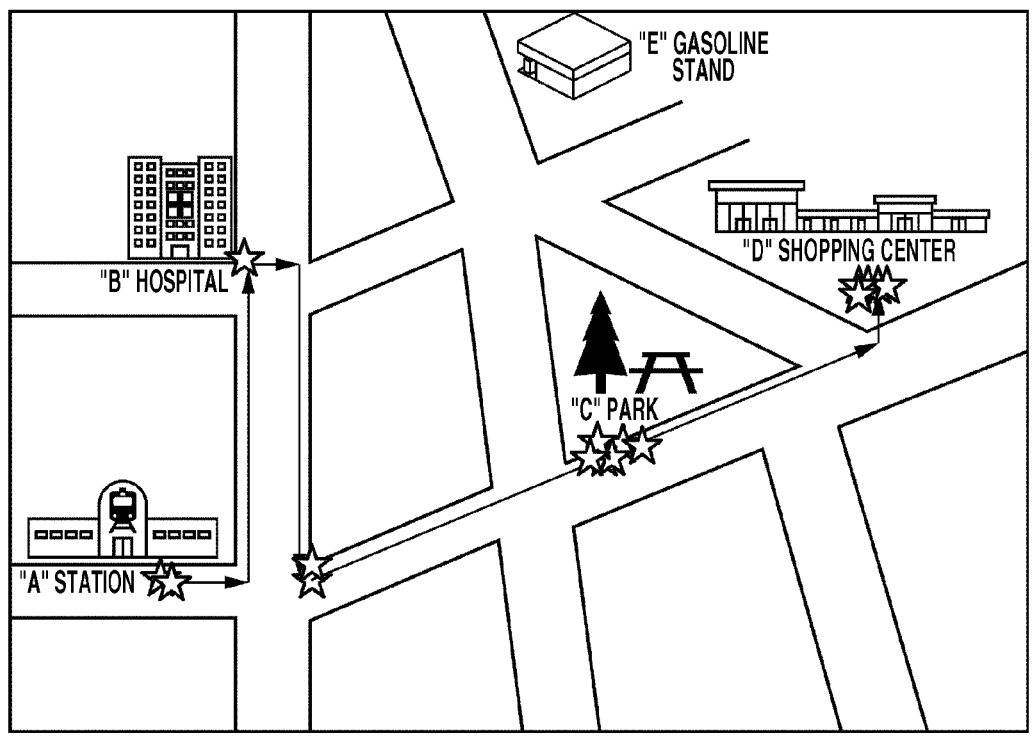
FIG. 3 illustrates an example of a map including a route where photos were taken.

Next, processing procedure in the present exemplary embodiment will be described. In the descriptions below, a case where photos are taken in the route illustrated in FIG. 3 will be described as an example. More specifically, first, photo is taken at "A" station. Then, the route goes to a "B" hospital and returns from there, next, passes through a "C" park, and finally goes to a "D" shopping center. Star marks illustrated in FIG. 3 denote points at which photos are taken.

Figure 4:
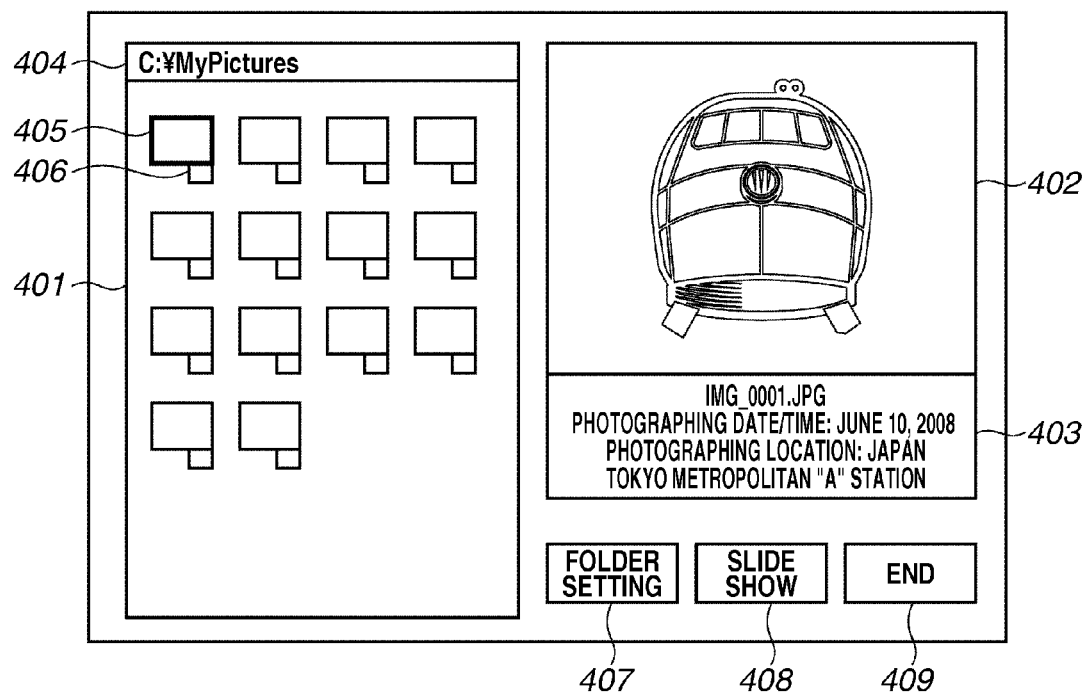
FIG. 4 illustrates an example of start screen displayed on a monitor.

FIG. 4 illustrates an example of activation screen to be displayed on the monitor 12. The activation screen illustrated in FIG. 4 includes a first area 401 where a list of thumbnail images of the image files stored in the HDD 30 is displayed, a second area 402 where the selected thumbnail image is displayed, and a third area 403 where information of the image is displayed. In the first area 401, a folder 404 in the HDD 30 currently being referred to is displayed. Then, in the folder 404, a thumbnail image 405 and a check box 406 are displayed. The thumbnail image 405 and the check box 406 are displayed for the number of images which exist in the folder 404. When the thumbnail image is selected, an image of a main body is displayed in the second area 402. In the third area 403 located below the second area 402, information concerning a file name, a photographing date/time, and a photographing location of the image is displayed.

Figure 5A:
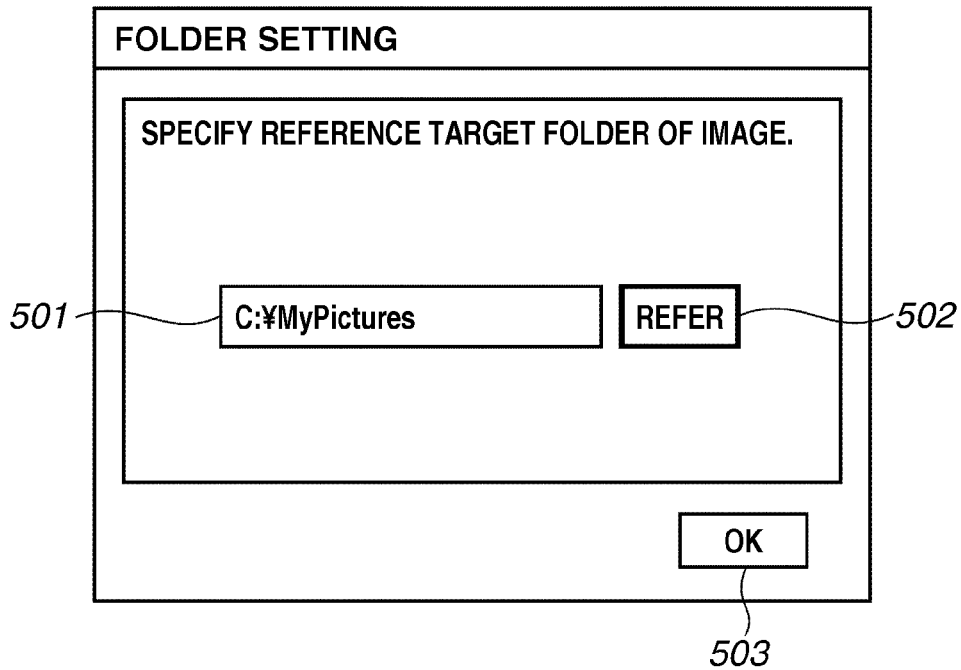
FIGS. 5A and 5B illustrate examples of screens for setting a folder and a slide show.

Further, in a right-bottom part of the screen, a folder setting button 407, a slide show button 408, and an end button 409 are displayed. When the folder setting button 407 is pressed, a screen illustrated in FIG. 5A is displayed, and when a reference button 502 is further pressed, a folder to be referred to can be changed or selected, then a path 501 of the folder is displayed. At this time, when the OK button 503 is pressed, the folder to be referred to can be set on the screen illustrated in FIG. 4. Further, a slide show button 408 is a button for displaying a slide show, and an end button 409 is a button for terminating the application.

Figure 5B:
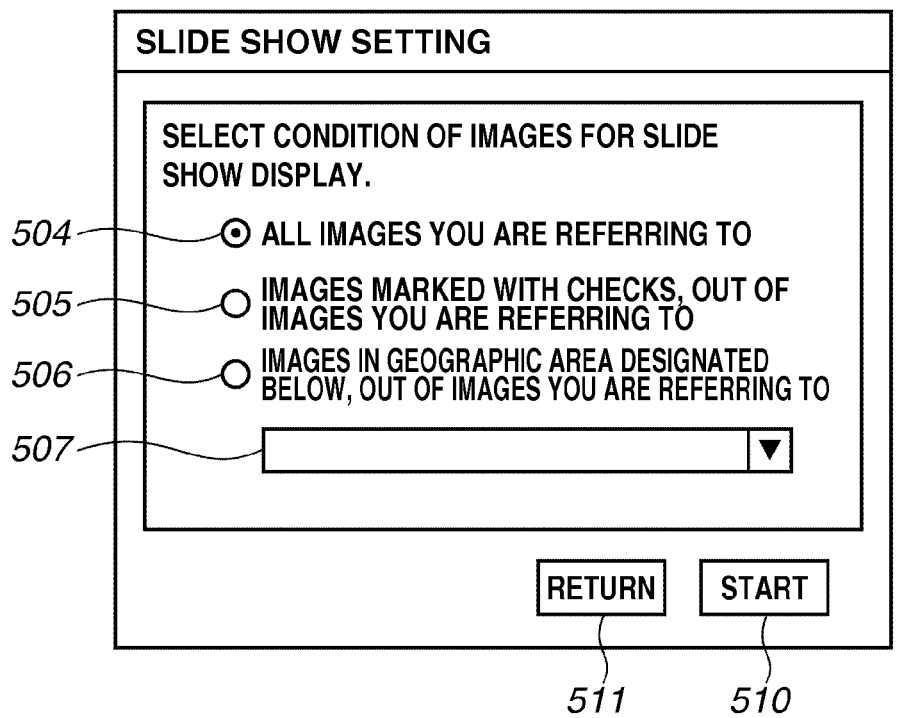

FIG. 5B illustrates an example of a screen which will be displayed by pressing the slide show button 408. This screen is a screen for setting a condition of images under which the slide show display is performed. In FIG. 5B, a first radio button 504 is used in a case where all images currently being referred to in the folder 404 illustrated in FIG. 4 are taken as a condition. A second radio button 505 is used in a case where only images marked with checks in the check box 406 are made a condition, out of images currently being referred to in the folder 404 illustrated in FIG. 4. A third radio button 506 is used in a case where only images of a district selected in a combo box 507 are taken as a condition, out of images currently being referred to in the folder 404 illustrated in FIG. 4. When a start button 510 is pressed, the slide show display is started, and when a return button 511 is pressed, the slide show display returns to the screen illustrated in FIG. 4 the processing.

Figure 6:
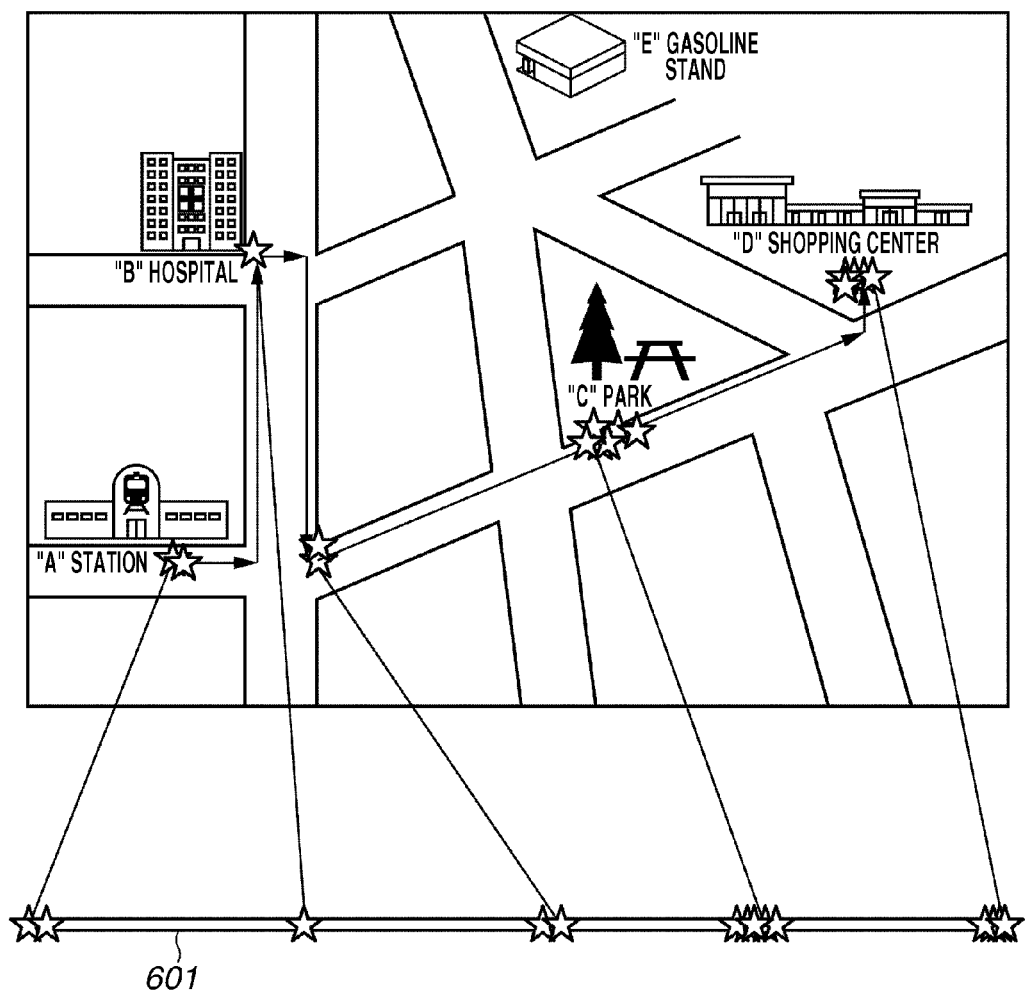
FIG. 6 illustrates an example of map and distance including a route where photos were taken.

Next, while referring to FIG. 6, a method for expressing the photographing route as a distance in one-dimension will be described. Also, in FIG. 6, similarly to FIG. 3, locations where photos were taken are denoted with star marks. As illustrated in FIG. 6, the "A" station which is a location where photo is taken first as a starting point, and the "D" shopping center which is a location where photo is taken last, is taken as an ending point. Further, a distance of the route tracked from the starting point to the ending point is expressed by a line segment 601, and a ratio between a distance from the starting point and a distance from the ending point, where the photo is taken on the way is expressed on the line segment 601. The line segment 601 illustrated in FIG. 6 is illustrated for explanation, and in reality, as illustrated in the next FIG. 8, the line segment 601 is displayed together with images as a distance bar.

Figure 7:
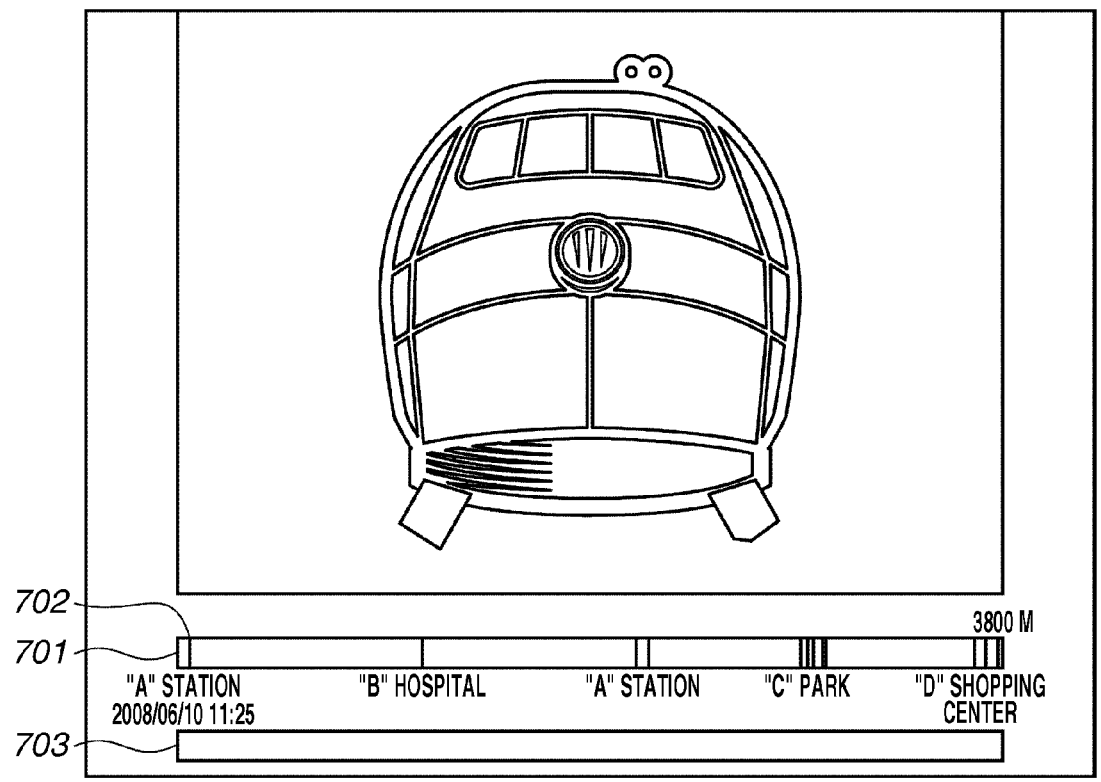
FIG. 7 illustrates an example of a screen of a slide show.

FIG. 7 illustrates an example of a screen of the slide show displayed after the start button 510 illustrated in FIG. 5B is pressed. First, in accordance with a condition set via the screen illustrated in FIG. 5B, a first image which falls under the condition is displayed. A control (movement process bar) 701 represents movement process at the time of photographing such as the photographing location and the photographing route of images, and a movement distance of the entire photographing route is displayed at right-end. A separator line 702 represents the photographing location of each image, and photographing area information is displayed below it. In a case where a plurality of images having the same photographing area information are continuous, the photographing area information will be displayed only below the separator line of the photographing location of the first image out of the plurality of images, without displaying the same photographing area information on each photographing location. In the present exemplary embodiment, in a separator position of the photographing location of the first image, continuous images having the same photographing area information has been collectively displayed, but the photographing area information may be displayed at the photographing location in the middle, or at the location of the last photographed image. Even when there is a plurality of images having the same photographing area information, if photographing time is apart from each other, or they are not continuously photographed images, photographing area information is displayed at positions corresponding to respective images. Continuously photographed images are images whose file numbers are serial, or images having a fore-and-aft relation when the images are lined up in the order of photographing time, and it is determined whether they are serial images from the file numbers or the photographing times. A control (time bar) 703 represents elapsed time. Since the image illustrated in FIG. 7 is the first image, there are no displays representing transition in the controls 701 and 703, but the photographing time of the first image is displayed at left-end of the control, and the photographing time of the last image is also displayed at right-end. Further, in the present exemplary embodiment, images are displayed in the order of photographing for a fixed length of time.

Figure 8:
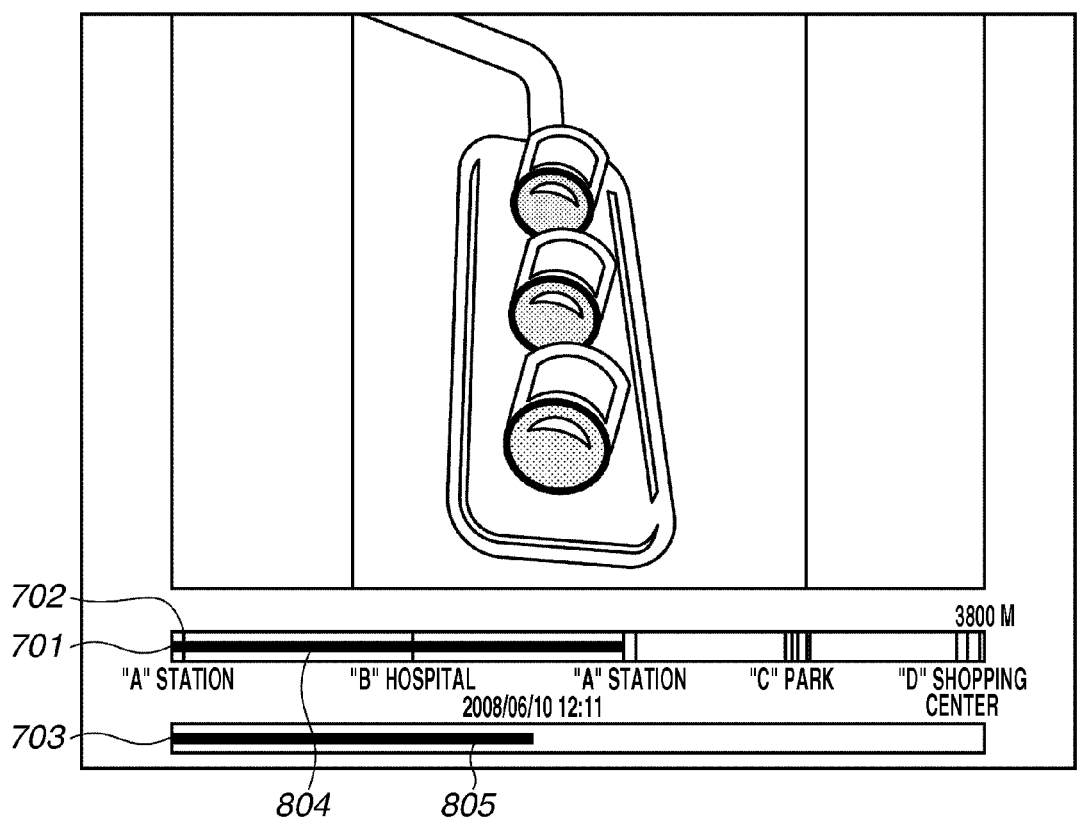
FIG. 8 illustrates an example of a screen of a slide show.

FIG. 8 illustrates a screen when displaying a fourth frame of image which is photographed when continuing the slide show display, starting from the "A" station, going through the "B" hospital, and again coming near the "A" station. In FIG. 8, the control 701 indicates movement process at the time of photographing. Vertical lines in a movement process bar 701 are separator lines 702, and indicate the photographing locations of the respective photographed images during the movement on movement process bar 701. A distance bar 804 indicates at what position the image currently displayed was photographed, in the entire movement process 701. Then, the separator position 702 is displayed at a position corresponding to a ratio of movement distances when the photographing locations of respective images are photographed, out of the movement distance of the entire photographing process 701. In the present exemplary embodiment, a bar 804 is displayed from a point (left-end of 701) where a movement distance in the entire movement process is 0, to a position indicating a photographing position of the image currently displayed. In other words, a distance bar 804 indicating a photographing position in the entire movement process of the image currently displayed, is displayed up to any of the separator lines 702 displayed in the entire movement process 701. Further, the right-end of the distance bar 804 (which becomes a position corresponding to the separator position) is displayed depending on a ratio of the movement distance when the photographing location of the image is photographed. As a result, a length of the distance bar 804 corresponds to a movement distance that the photographing location moves until the image currently displayed is photographed. In the present exemplary embodiment, the distance bar 804 is displayed as a bar corresponding to a movement distance in the entire movement process of the image currently displayed. Instead of the bar display, a predetermined mark may be displayed at a position in the entire movement process indicating the photographing position of the image currently displayed.

By checking the distance bar 804, the user can recognize where the image was photographed, and a position (ratio) of the photographing location and transition of movement in the movement process of the entire photographing route. Moreover, an elapsed time bar 805 indicates a ratio of an elapsed time up to the photographing location of the image currently displayed, to the entire elapsed time during movement process, and the user can recognize the elapsed time at the time of photographing. On top of the elapsed time bar 805, specific photographing date/time of the image currently displayed is displayed. When a movement start time (photographing time of a first image) of the entire photographing route is displayed at left-end, and a movement terminated time (photographing time of the last image) at right-end, it becomes easier for the user to recognize a relation between time and movement process.

Moreover, when any of the separator lines 70 indicating the photographing location is designated during slide show display, the slide show is immediately switched to a display of the photographed image. At this time, the distance bar 804 moves to the position of the designated separator line, and in response to this, the elapsed time bar 805 also moves to a position corresponding to photographing time at the designated separator line. Thereafter, when a certain time elapses, the slide show display is resumed in the order of photographing from an image corresponding to the selected separator line. In FIG. 7 and FIG. 8, the separator lines are displayed only on the movement process bar 701, but similarly to the movement process bar 701, the separator lines may be displayed on the time bar 703 as well at positions corresponding to time when respective images are photographed. At this time, a relation between the movement process and the time development may be displayed in an easy-to-understand manner, by connecting the separator lines corresponding to the same images with the line segments, out of the separator lines displayed on the movement process bar 701 and the separator lines displayed on the time bar 703. In the present exemplary embodiment, photographing locations of respective images in the movement process bar 701, and photographing time of respective images in the time bar 703, are each displayed with the separator lines, but may be displayed with predetermined marks, or dotted lines or the like. Any display form may be used, as long as the user can recognize the photographing locations of respective images in the movement process bar 701, and the photographing time of respective images in the time bar 703.

Figure 9:
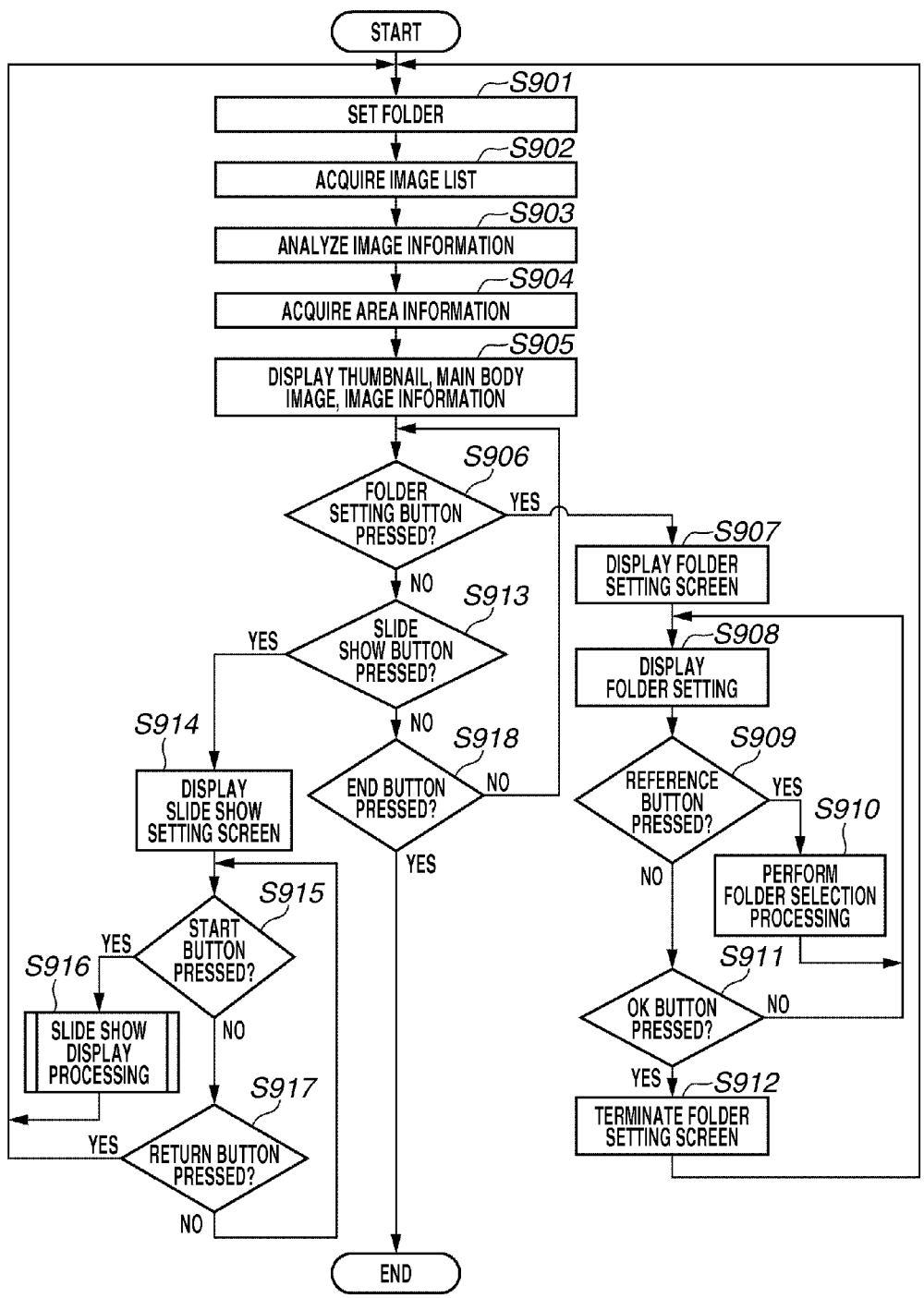
FIG. 9 is a flowchart illustrating an example of procedure of setting a photographed image.

Next, a procedure for performing slide show display of photographed images will be described, while referring to the flowchart in FIG. 9. FIG. 9 is a flowchart illustrating an example of procedure for setting the photographed images to be displayed in the slide show.

First, in step S901, in accordance with the control of the control unit 50, the recording reproduction unit 32 sets a folder, which was set at the time of preceding activation operation, as a reference folder from the HDD 3. When activating for the first time, the recording reproduction unit 32 sets a folder which has been set as default, as the reference folder. Next, in step S902, the image list management unit 52 acquires a list of images saved in the reference folder.

Next, in step S903, the image analysis unit 53 acts as an acquisition unit, and analyzes additional information of an image file included in the acquired image list, and acquires photographing date/time information and information of latitudes and longitudes as photographing location information. As such information, the information added to a header of Exif may be utilized. Even when the photographing location information is not added to the image file, the information may be acquired in the light of the photographing date/time information, if log data of GPS is available as additional information. Then, the image analysis unit 53 acquires these information, and creates an image table as illustrated in FIG. 10A.

FIG. 10A illustrates an example of the image table of the photographing date/time information and the photographing location information. As illustrated in FIG. 10A, information of latitudes is expressed by numerical values, i.e., north latitude is denoted as "+", south latitude as "−", degree as "dd" (00 to 90), minute as "mm" (00 to 60), and second as "ss.sss" (00 to 60, numerical values of decimal places have three digits in the decimal system). Information of longitudes is also similarly expressed by numerical values, i.e., east longitude is denoted as "+", west longitude as "−", degree as ddd (000 to 180), minute as mm (00 to 60), and second as ss.sss (00 to 60, numerical values of decimal places have three digits in the decimal system).

In a case where an image of which photographing location information cannot be acquired is included in the image table, if photographing location information about two or more frames of image can be acquired, the same photographing location information as that of an image of the acquired photographing location information which have closest photographing date/time is applied. In a case where there are not two or more frames of images which show photographing location information, photographing location information of other images is not applied, since the photographing route cannot be confirmed while displaying images. Further, acquisition of area information described below will not be performed. In this case, when slide show displays as illustrated in FIG. 7 and FIG. 8 are performed, only images, or only images and time bar are displayed.

Next, in step S904, the area information acquisition unit 54 acts as an acquisition unit, and the communication management unit 40 acquires area information from an external wireless base station by the control of the area information acquisition unit 54. As described above, in the present exemplary embodiment, area information is acquired from the external wireless base station, but may be acquired from the HDD 30 or a server on another network. Further, as area information, three types of information with different sizes of area are supposed to be acquired. More specifically, country name information as information 1, information of prefectures and provinces and the like as information 2, and information of landmarks as information 3 are supposed to be acquired. FIG. 10B illustrates an example of the image table on which the area information has been reflected. In this way, information for performing slide show display will be assembled by the processing up to step S904.

Next, in step S905, the rendering management unit 36 creates data of screen as illustrated in FIG. 4 by the control of the UI management unit 51, and displays thumbnail images or main body images, image information or the like on the monitor 12. Then, in step S906, the keyboard/mouse control unit 35 checks whether the folder setting button 407 has been pressed by the user manipulating a mouse 14 or the like. As a result of the check, if the button has been pressed (YES in step S906), the processing proceeds to step S907, and the rendering management unit 36 creates data of the folder setting screen as illustrated in FIG. 5A and displays it on the monitor 12. Then, in step S908, the rendering management unit 36 displays a path 501 as illustrated in FIG. 5A as a position of the set reference folder.

Next, in step S909, the keyboard/mouse control unit 35 checks whether a reference button 502 has been pressed by manipulation of the mouse 14 or the like by the user. As a result of the check, if the button has been pressed (YES in step S909), then in step S910, the rendering management unit 36 displays a dialogue for selecting a folder, and allows the user to designate a folder to be referred to. Then, when the folder to be referred to is decided, then the processing returns to the step S908, and updates a folder to be displayed on the path 501.

On the other hand, as a result of the check in step S909, if the reference button 502 has not been pressed (NO in step S909), then in step S911, the rendering management unit 36 similarly checks whether the OK button 503 has been pressed. As a result of the check, if the button has not been pressed (NO in step S911), then the processing returns to step S908. If the button has been pressed (YES in step S911), then in step S912, the rendering management unit 36 updates folder setting information to terminate the folder setting screen, and the processing returns to step S901.

On the other hand, as a result of the check in step S906, if the folder setting button 407 has not been pressed (NO in step S906), then in step S913, the rendering management unit 36 similarly checks whether the slide show button 408 has been pressed. As a result of the check, if the button has been pressed (YES in step S913), the processing proceeds to step S914, where the rendering management unit 36 creates data of the slide show setting screen as illustrated in FIG. 5B, and displays it on the monitor 12. At this time, in the combo box 507 in FIG. 5B, area information of the image list is displayed as selection items. The selection items are configured such that any of "area information 1 only", or "area information 1 and area information 2", or "area information 1, area information 2 and area information 3" can be designated. Accordingly, the user can designate a broad area, or designate an area narrowed to some extent.

Next, in step S915, the keyboard/mouse control unit 35 checks whether a start button 510 has been pressed when the user manipulates the mouse 14 or the like. As a result of the check, if the start button 510 has been pressed (YES in step S915), the processing proceeds to step S916, and slide show display is performed, and then the processing returns to step S901. The detailed processing of the slide show display will be described below. On the other hand, as a result of the check in step S915, if the start button 510 has not been pressed (NO in step S915), then in step S917, in a similar way, it is checked whether a return button 511 has been pressed. As a result of the check, if the button has been pressed (YES in step S917), then the processing returns to step S901. If the button has not been pressed (NO in step S917), the processing returns to step S915.

On the other hand, as a result of the check in step S913, if the slide show button 408 has not been pressed (NO in step S913), then in step S918, in a similar way, the keyboard/mouse control unit 35 checks whether the end button 409 in FIG. 4 has been pressed. As a result of the check, if the button has not been pressed (NO in step S918), the processing returns to step S906. If the button has been pressed (YES in step S918), the processing is terminated.

Next, detailed processing procedure in the slide show display in step S916 in FIG. 9 will be described while referring to FIG. 11. FIG. 11 is a flowchart illustrating an example of processing procedure of the slide show display. First, in step S1101, the image list management unit 52 inputs a condition selected in the screen illustrated in FIG. 5B by the user manipulating the mouse 14 or the like, via the keyboard/mouse control unit 35.

Next, in step S1102, the image list management unit 52 checks whether the button selected in the screen in FIG. 5B is a second radio button 505 for designating only check-marked images, out of images being referred to. As a result of the check, if the second radio button 505 has been selected (YES in step S1102), the processing proceeds to step S1103, where the image list management unit 52 adds information of presence or absence of checks to the image table illustrated in FIG. 10B. Then, the processing proceeds to step S1104.

On the other hand, as a result of the check in step S1102, if the second radio button 505 has not been selected (NO in step S1102), then in step S1104, the image list management unit 52 creates separately an image table for slide show. If the second radio button 505 illustrated in FIG. 5B, for example, has been selected, the image list management unit 52 creates an image table for slide show using only the image information marked with checks in the image table. Further, if a third radio button 506 for designating a district has been selected, the image list management unit 52 creates an image table for slide show using only image information which agrees with the designated district information.

The descriptions will be given hereinbelow, assuming that a first radio button 504 for designating all images currently being referred to has been selected. Next, in step S1105, the photographing location transition management unit 55 acts as a calculation unit, and calculates a section distance between the photographing locations of two serial images when lined up in the order of the photographing date/time. As a calculation method, the distance is obtained from information of latitudes and longitudes.

Next, in step S1106, the photographing location transition management unit 55 calculates a cumulative distance of the photographing locations from the first image to respective images, from the section distance between the photographing locations of two serial images obtained in step S1105. Then, the image list management unit 52, as illustrated in FIG. 12A, adds information of the cumulative distance to the image table for slide show created in step S1104. Accordingly, the photographing location transition management unit 55 can calculate ratios of distances of the photographing locations from the first image to respective images, to the movement distance of the entire photographing route from the first image to the last image. In the exemplary embodiment, images are lined up in the order of the photographing date/time to determine the order of photographing of images, using information of the photographing date/time. Normally, however, since the file numbers are assigned in the order of photographing, the photographing location transition management unit 55 may determine the order of photographing from information of file numbers of image files, instead of the photographing date/time information, and thereafter, may calculate the section distance between the photographing locations of two serial images.

Next, in step S1107, the rendering management unit 36 displays separator lines of photographing locations, area information, and a distance bar indicating the entire movement distance, on a display screen of the slide show, as illustrated in FIG. 7. Then, in step S1108, the rendering management unit 36 initializes a number "i" of an image designated in the slide show display into to 1.

Next, in step S1109, the recording reproduction unit 32 reads out i-th image file which becomes a target of the slide show display from the HDD 30, and the rendering management unit 36 displays the i-th image. Moreover, the rendering management unit 36 updates the display of the elapsed time bar, the photographing date/time information, and the movement distance bar, from the photographing time information of the i-th image and the distance obtained in step S1106. Next, in step S1110, the UI management unit 51 initializes a variable "S" indicating display time to 0, as processing for subjecting one image to setting time display. Then, in step S1111, the UI management unit 51 performs a sleep of 200 milliseconds, and adds 200 to "S". In the present exemplary embodiment, descriptions will be given supposing that a time taken to display one image is set at 3000 milliseconds.

Next, in step S1112, the keyboard/mouse control unit 35 checks whether a particular image has been designated by the user's manipulation. In this process, manipulation for designating an image, is a manipulation for selecting an image of any photographing location indicated on the separator lines 702 of the control 701. A manipulation for selecting the area information such as geographical names displayed below the control 701 may be acceptable. A manipulation method includes performing manipulation for advancing to next processing by clicking on the separator lines 702 using the mouse 14, or by using the keyboard 18 (button manipulation if a device is not a computer).

As a result of the check in step S1112, if a particular image has been designated (YES in step S1112), the processing returns to step S1109, where the rendering management unit 36 displays the designated image as the i-th image, and updates the display of the elapsed time bar, the photographing date/time information, and the distance bar. On the other hand, as a result of the check in step S1112, if a particular image has not been designated (NO in step S1112), the processing proceeds to step S1113. In step S1113, the UI management unit 51 checks whether "S" has reached 3000 milliseconds. As a result of the check, if "S" has not reached 3000 milliseconds (NO in step S1113), the processing returns to step S1111.

By doing so, during the display of the slide show, the user can select and designate an image which the user wants to see from the area information, and it becomes possible to perform slide show display in order according to the photographing date/time information again from that. In the present exemplary embodiment, although the separator lines are displayed only on the distance bar, and are enabled to be designated by the user's manipulation, the separator lines of photographing time, and photographing date/time above and below the respective separator lines may be displayed on the elapsed time bar as well, and may be enabled to be designated by the user's manipulation. By doing so, the user can search out and designate an image which the user wants to see based on not only the photographing locations but also the photographing dates/times. Further, if the movement process bar is selected for the user's manipulation, processing of the image display may be performed supposing that a separator line close to the selected position has been selected, even when there is not a separator line at the selected position.

On the other hand, as a result of the check in step S1113, if "S" has reached 3000 milliseconds (YES in step S1113), then in step S1114, the UI management unit 51 checks whether the i-th image currently being displayed is the last (N-th) image. As a result of the check, if the display is not yet completed to the last, (NO in step S1113), then in step S1115, the UI management unit 51 increments "i", and the processing returns to step S1109. On the other hand, as a result of the check in step S1114, if the display is completed to the last, (YES in step S1114), then in step S1116, the rendering management unit 36 terminates the slide show display, and the processing returns to in step S901 in FIG. 9.

According to the present exemplary embodiment, as described above, when slide show display of the image designated on the slide show is performed, it is ensured that the movement distance bar and the elapsed time bar together with the photographed image are displayed. Accordingly, even without map data, the user can appreciate the photographed images, and keep track of the photographing route, transition of the movement distance, and transition of time. Further, since locations where photographing is performed are displayed on the distance bar, when the user wants to display images which are photographed at any particular location, the user can immediately display the photographed images of the particular location.

In the first exemplary embodiment, descriptions have been given of an example in which photographing area is such a narrow area as people can move on foot. On the other hand, it is conceivable that a distance of photographing route becomes very long even in a slide show display of one time, for example, when photographs are taken while taking a trip to see the sights of main tourist spots of a few countries. Also in a case of using an application provided with map information, a map to be displayed together with images will be displayed in a broad area, and thus it becomes difficult to grasp detailed locations in each photographing area. Thus, the present second exemplary embodiment takes such a case into consideration.

As a specific example, as illustrated in FIG. 12B, a case of taking a trip from Japan to Hawaii will be described. A configuration of the PC and rough processing of the slide show in the present exemplary embodiment is similar to those in the first exemplary embodiment, and thus only different portions will be described.

Figure 13:
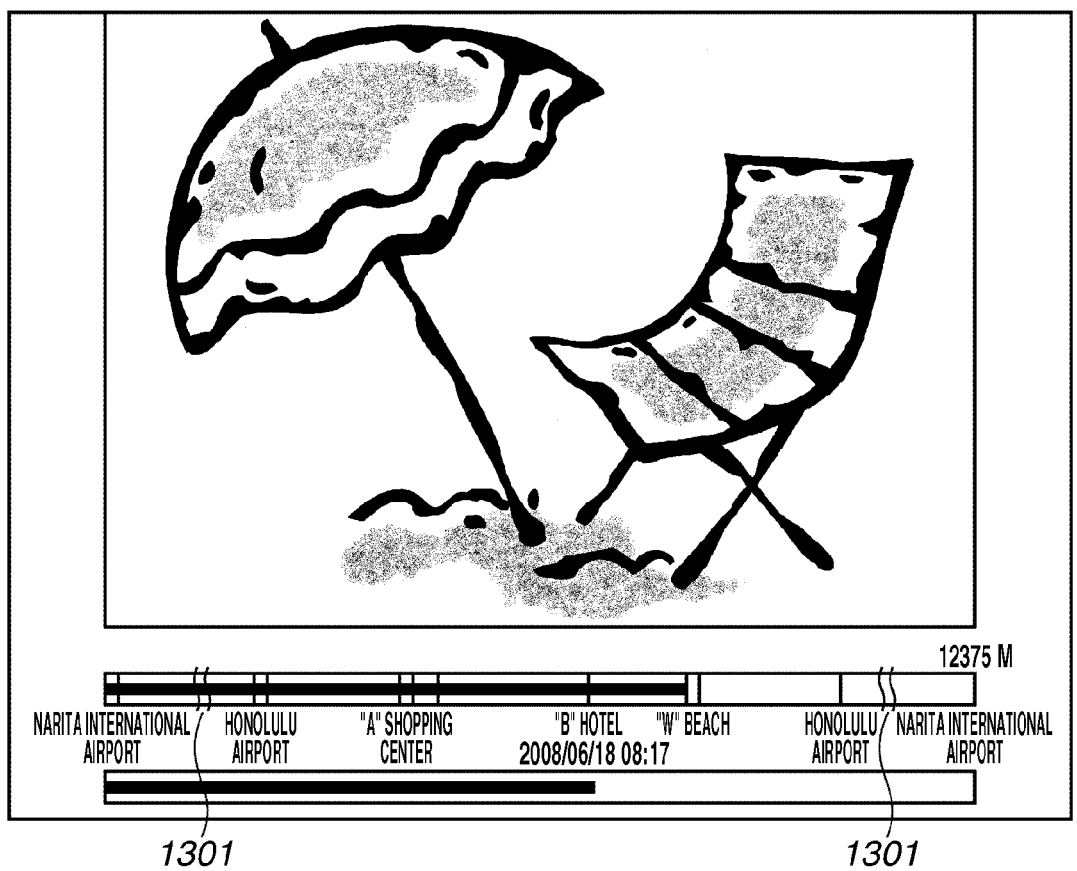
FIG. 13 illustrates an example of a screen of a slide show.

In step S1105 in FIG. 11, section distance between photographing locations of serial images are calculated. As a result of the calculation, if there is a distance exceeding a threshold value of e.g., 1000 km as a predetermined value, the section distance is not reflected on the distance bar. More specifically, when the distance bar is displayed in step S1107 or in step S1109, as illustrated in FIG. 13, sections 1301 of distances equal to or greater than the threshold value will be omitted. In the present exemplary embodiment, although the threshold value is provided for section distances, it may be used for determination whether area information is to be omitted. In other words, in the present exemplary embodiment, since the information 1 illustrated in FIG. 12B is assigned to country name information, section distances of images in which the information 1 is different may be omitted.

According to the present exemplary embodiment as described above, section distances are omitted, if a movement distance is great. As a result, it becomes possible to display in an easy-to-follow way a photographing route to which the user wants to pay attention or transition of movement distances.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-092530 filed Apr. 13, 2010, which is hereby incorporated by reference herein in its entirety.

What is claimed is:

1. A display control apparatus comprising:
an acquisition unit configured to acquire a plurality of photographed images;
a calculation unit configured to calculate movement process when the plurality of images is photographed, from attribute information of the plurality of photographed images; and
a display control unit configured to display on a display unit a bar indicating the movement process when the plurality of photographed images is photographed, and display information indicating photographing locations of the plurality of photographed images, at positions corresponding to photographing locations of the plurality of photographed images in the bar indicating the movement process,
wherein, as a result of calculation by the calculation unit, if a movement distance in the movement process exceeds a predetermined value, the display control unit does not reflect a transition of the movement distance but displays the bar indicating the movement process.

2. The display control apparatus according to claim 1, wherein the display control unit displays a photographed image together with the bar, and displays in a recognizable way a photographing location of a photographed image currently being displayed, from among photographing locations of the plurality of photographed images in the bar indicating the movement process.

3. The display control apparatus according to claim 2, wherein the display control unit displays a predetermined mark at the photographing location of the photographed image currently displayed, from among photographing locations of the plurality of photographed images of the bar indicating the movement process.

4. The display control apparatus according to claim 2, wherein the display control unit displays as the bar indicating the movement process, a movement distance bar corresponding to a ratio of a movement distance to a photographing location of the photographed image currently being displayed, out of movement processes of the plurality of photographed images.

5. The display control apparatus according to claim 2, wherein the display control unit further displays a time bar for displaying photographing time of photographed images, and displays photographing time of the photographed image currently being displayed using the time bar.

6. The display control apparatus according to claim 2, wherein the display control unit displays as the time bar, an elapsed time bar corresponding to a ratio of an elapsed time until the photographing time of the photographed image currently being displayed, in elapsed times of movement processes of the plurality of photographed images.

7. The display control apparatus according to claim 2, wherein the display control unit displays as the bar indicating the movement process, a movement distance bar corresponding to a ratio of a movement distance up to the photographing location of the photographed image currently being displayed, in movement processes of the plurality of photographed images,
wherein, the display control unit further displays an elapsed time bar corresponding to a ratio of an elapsed time up to photographing time of the photographed image currently being displayed, in elapsed times in movement processes of the plurality of photographed images.

8. The display control apparatus according to claim 7, wherein the display control unit displays a movement distance bar in the bar indicating the movement process and the elapsed time bar in association with each other.

9. The display control apparatus according to claim 8, further comprising:
a selection unit configured to select a photographing location, in the bar indicating the movement process,
wherein the display control unit displays a photographed image corresponding to the selected photographing location, according to selection of a photographing location, by the selection unit, and moreover, changes displays of the movement distance bar and the elapsed time bar, according to photographing location and photographing time of a newly displayed photographed image.

10. The display control apparatus according to claim 9, wherein the selection unit can select any position of the bar,
wherein the display control unit, if a position other than photographing locations is selected by the selection unit, displays a photographed image corresponding to a photographing location close to the selected position.

11. The display control apparatus according to claim 1, wherein the display control unit displays time when a photographed image currently being displayed is photographed.

12. The display control apparatus according to claim 1, further comprising:
an acquisition unit configured to acquire information relating to photographing locations of the plurality of photographed images,
wherein the display control unit displays, at a position corresponding to a photographing location of a photographed image in the bar indicating the movement process, information relating to the photographing location.

13. The display control apparatus according to claim 12, wherein the display control unit, if information relating to photographing locations of continuous photographed images is the same, does not display information relating to the photographing location for each photographed image, but collectively displays it.

14. The display control apparatus according to claim 13, wherein the display control unit, if photographed images, even having the same information relating to photographing locations, are not continuously photographed, displays information relating to the photographing locations for each image.

15. The display control apparatus according to claim 1, wherein the calculation unit, if information related to positions of photographing does not exist in photographic information, calculates a movement process, using information related to a photographing position of a photographed image showing closest photographing date/time.

16. The display control apparatus according to claim 1, wherein the calculation unit calculates movement process at the time of photographing, according to information of positions where the plurality of images is photographed, and information of photographing date/time.

17. The display control apparatus according to claim 1, wherein the calculation unit calculates movement process at the time of photographing, according to information of positions where the plurality of images is photographed, and information of file numbers.

18. The display control apparatus according to claim 1, wherein the display control unit displays a time bar for indicating photographing time of photographed images, and displays information indicating photographing time of the plurality of photographed images, at positions of the time bar corresponding to photographing time of the plurality of photographed images,
wherein the display control unit displays a position of the bar indicating the movement process corresponding to a photographing location of the same photographed image, and a position of the time bar corresponding to photographing time of the plurality of photographed images in association with each other.

19. The display control apparatus according to claim 18, wherein the display control unit displays lines or predetermined marks at positions corresponding to the bar indicating the movement process, as information indicating photographing locations of the plurality of photographed images, and displays a line or a predetermined mark, at corresponding position of the time bar, as information indicating photographing time of the plurality of photographed images.

20. A method of controlling a display control apparatus comprising:
acquiring a plurality of photographed images;
calculating movement process when the plurality of images is photographed, from attribute information of the plurality of photographed images; and
displaying on a display unit a bar indicating the movement process when the plurality of photographed images is photographed, and information indicating photographing locations of the plurality of photographed images, at positions corresponding to photographing locations of the plurality of photographed images in the bar indicating the movement process,
wherein, as a result of calculation, if a movement distance in the movement process exceeds a predetermined value, the display unit does not reflect a transition of the movement distance but displays the bar indicating the movement process.

* * * * *